May 30, 1967 H. BLAZEK ET AL 3,321,979
ATTITUDE SENSOR
Filed Sept. 30, 1963 2 Sheets-Sheet 1

INVENTORS
HENRY BLAZEK
NAI-CHONG CHANG
BY
Raymond R. Skolnick

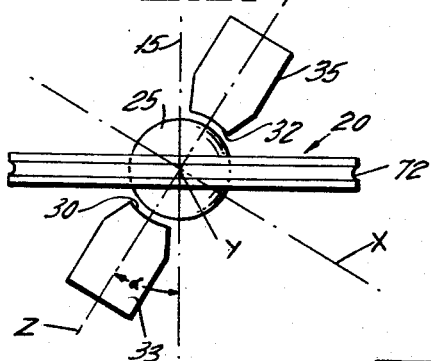
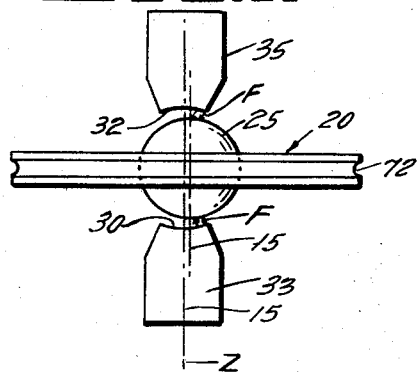
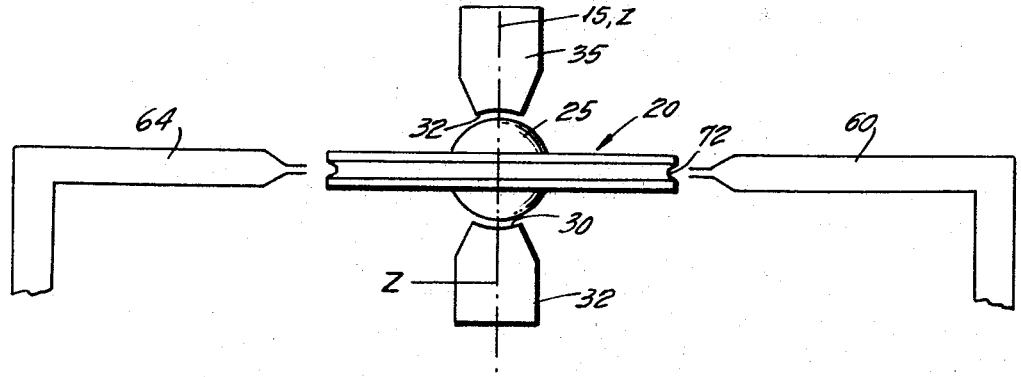
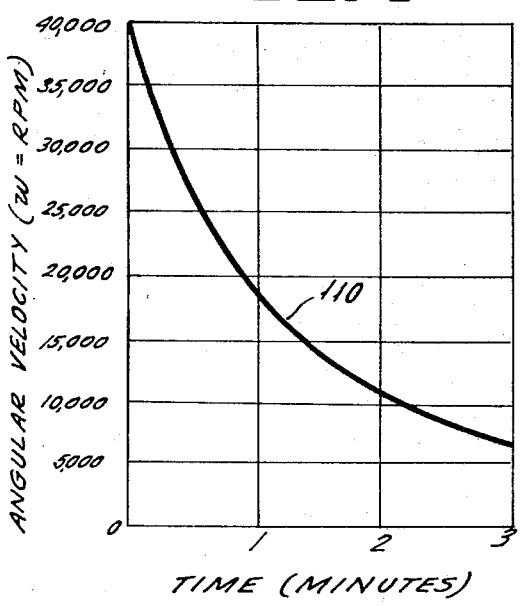
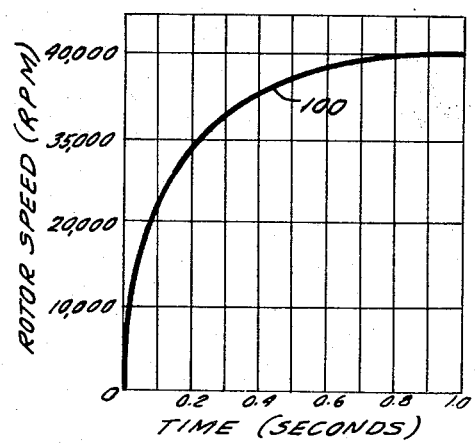
INVENTORS
HENRY BLAZEK
NAI-CHONG CHANG
BY Raymond R. Skolnick

United States Patent Office

3,321,979
Patented May 30, 1967

3,321,979
ATTITUDE SENSOR
Henry Blazek, Nyack, and Nai-Chong Chang, New Rochelle, N.Y., assignors to Sperry Rand Corporation, Ford Instrument Company Division, Long Island City, N.Y., a corporation of Delaware
Filed Sept. 30, 1963, Ser. No. 312,462
17 Claims. (Cl. 74—5)

Our invention relates to a gyroscopic apparatus and more particularly to such an apparatus wherein the rotating gyroscopic mass is hydrostatically supported in a manner avoiding the complex gimbal supports of the prior structures. The extreme simplicity and ruggedness afforded by our invention makes it particularly useful in high-g environments (as for example 300 g), while demonstrating extreme reliability, increased accuracy of measurement, and lower fabrication costs.

It is known that a freely mounted spinning mass will exhibit the gyroscopic property of remaining in its original plane of rotation regardless of how the base housing is reorientated. In order to freely mount the spinning mass with respect to the base, it has been the conventional practice to rotatively secure the gyroscopic mass (usually of a wheel-like configuration) to a longitudinal axle; the axle is in turn secured to a successive array of interconnected annular gimbal members. For example, to provide a two-degree-of-freedom gyro movement, the axis of rotation of the spinning member is pivotally mounted to diametrically opposed regions of an inner or floating gimbal, with that gimbal in turn pivotally mounted to a second gimbal. To provide universal movement of the gyroscope, the second gimbal is in turn pivotally mounted to a third gimbal. Such complex arrangements of gimbals and bearing supports interconnected therebetween have been found to provide significant frictional forces, which adversely affect the accuracy of measurement. That is, the principal cause of deflection in such prior gyroscopic devices is friction in the bearings and pivots, with the multigimbal support arrangement being a limiting factor in obtaining high accuracy of measurement. This limitation has been especially severe in the design of high-g devices.

The instant invention departs from the gimbal supported mounting of the gyroscopic mass, and accordingly achieves a substantial lowering of the deflective frictional forces, while providing increased simplicity, ruggedness and accuracy of operation. More specifically, our gyroscopic mass includes an integral spherical support member at its central region, having spherical support surfaces projecting outward from opposed surfaces of the gyroscopic wheel. Such a spherical support member may typically be a readily available commercial type ball bearing, press fit into a circular aperture of the rotating gyroscopic mass, and integrally formed therewith. Supporting pads are oppositely located about the projecting spherical surfaces, which supporting pads include spherical indentations constructed to define a spherical volume to contain the spherical bearing member therebetween. The spacing of the support pads about the spherical bearing is arranged to provide a thin gap therebetween. A pressurized gas flow is directed into the gap (via gas inlet openings in the support pad members), to thereby effect a hydrostatic gas bearing support of the rotating gyroscopic mass. Accordingly, with only a single hydrostatic bearing, we obtain a two-degree-of-freedom gyroscopic movement, thereby achieving a substantial reduction of bearing friction over the heretofore used multigimbal arrangements, while yielding a considerably less complicated support structure.

The low frictional engagement, extreme ruggedness and simplicity of fabrication afforded by our invention has given it particular utility in high-g applications, as for example, attitude sensing in short range battlefield type missiles. The motivating means for rapidly rotating the gyroscopic mass may be provided by a plurality of gas ejecting nozzles peripherally located about the rotatable mass. Gas receiving bucket type pockets are formed about the outer periphery of the gyroscopic mass, such that the gas flow directed thereagainst will provide rapid rotational movement of the gyroscopic member about its axis of rotation. Preferably the gas source for both the motivating means and hydrostatic gas bearing is provided by a common supply, with the nozzle supply being deactivated responsive to the gyroscopic member attaining a suitable operating speed. Such a speed may, for example, be 40,000 r.p.m., obtainable in approximately 75 milliseconds from a rest position. Alternatively, other motivating means may be utilized in conjunction with the preferable hydrostatic bearing support of our invention, with such motivating means providing either short duration or continuous rotation of the gyroscopic member.

As a further advantageous aspect of our invention, centering of the gyroscopic mass about the support pad is automatically obtained by the pressure differentials on the surface of the pad acting on the support bearing. That is, when the spherical support bearing is concentrically located within the volume defined by the pad support members, a symmetric pressure distribution is established about the intermediate gap. Off-center movement of the support bearing with respect to the support pad members constricts the gap at the regions of such off-center movement, resulting in a buildup of pressure in a direction tending to restore the support bearing to its central location. Hence, the hydrostatic bearing support acts as a spring member, tending to keep the spherical bearing in its concentric position. Further, the pressurized gas directed into the gap is preferably of a sufficient pressure to properly maintain the hydrostatic bearing support when subjected to substantial acceleration forces (as for example 300 g), in the direction of the support bearing axis.

During the initial spin-up period, caging of the gyroscopic mass in its referenced position is advantageously provided by the same gas jets that accelerate the mass. The periphery of the gyroscopic mass is of a notched configuration such that should the gyroscopic member stray from its referenced position, restoring torques will be developed by the gas flow within the notched periphery to suitably align the gyroscopic mass. Hence, the motivating nozzles serve the additional function of aerodynamically caging the gyroscopic mass so that its angular momentum vector is initially aligned with respect to the gyro housing along the support pad axis.

As another advantageous aspect of our invention, mechanical caging of the gyroscopic member prior to activation thereof is provided by peripherally located means, such as biased spring members, which engage the outer periphery of the gyroscopic mass. A release means, such as a pin secured to a rotatable caging ring and in the direction of the gas flow is provided. The pin and caging ring are moved responsive to the gas jet flow such that the mechanical caging means is automatically released responsive to activation of the gas jet motivating means.

In the preferred illustrative embodiment of our invention, the novel gyroscopic apparatus is shown operating as an attitude sensor, with the attitude variation signals being provided by energy sensing means, such as light sensitive photo pots, secured to the housing of the apparatus. An energy source means, such as a small light source, establishes an energy flow path which reflectively includes a surface of the gyroscopic wheel. Accordingly, attitude variation of the housing with respect to the fixed reference disposition of the gyroscopic mass effect a variation in the energy path reflected to the energy sensitive photo pots, thereby providing a direct readout of attitude variation. A separate photo pot and light source are shown to independently yield attitude variation information about mutually perpendicular axes, perpendicular to the pad axis.

It is accordingly seen that the basic concept of our invention resides in a novel support arrangement for a gyroscopic apparatus wherein the rotating member is freely supported by a single spherical hydrostatic gas bearing. Further, the spinning member is initially aerodynamically caged by the same gas jets that provide acceleration thereof.

It is accordingly a primary object of our invention to provide an improved support arrangement for a gyroscopic apparatus.

A further object of our invention is to provide a hydrostatic gas bearing support for a rotating gyroscopic wheel.

An additional object of our invention is to provide a two degree of freedom gyro movement wherein the rotating gyroscopic wheel is supported by a single hydrostatic gas bearing.

Another object of our invention is to provide for the mounting of a gyroscopic member in an improved manner avoiding the multigimbal support members conventionally used.

Yet a further object of our invention is to provide an improved gyroscopic structure wherein the rotating gyroscopic member is supported by a spherical hydrostatic gas bearing, and aerodynamically caged in its referenced position.

Yet an additional object of our invention is to provide such a gyroscopic apparatus wherein centering of the rotating gyroscopic member within its support structure is automatically obtained by the build up of pressure differentials responsive to off center movement thereof.

Yet another object of our invention is to provide an attitude sensor adaptable for high-g operation, wherein a rotating gyroscopic mass is hydrostatically supported by a centrally located spherical bearing.

Still a further object of our invention is to provide such an attitude sensor including a plurality of gas ejecting nozzles peripherally about the rotating member for providing both rapid acceleration thereof and aerodynamic caging in its referenced disposition.

This as well as other objects of our invention will readily become apparent upon a consideration of the following drawings in which:

FIGURE 3 is a simplified diagrammatic representation showing the relative freedom of movement of the attitude sensor housing and support pads with respect to the fixed disposition in space of the rotating gyroscopic wheel;

FIGURE 4 is a similar diagrammatic representation showing the manner in which centering of the bearing support surfaces within the support pads is obtained by pressure differentials responsive to misalignment;

FIGURE 5 is another diagrammatic representation showing the interrelationship of the gas jet flow and peripheral wheel configuration to aerodynamically cage the wheel in its referenced disposition, during the initial acceleration period;

FIGURE 6 is a graphical representation of the speed up time characteristics for a typical apparatus constructed in the manner of FIGURES 1 through 5;

FIGURE 7 is a graphical representation of the coastdown characteristic for such an attitude sensor designed for short duration operation.

Figures 1, 2:
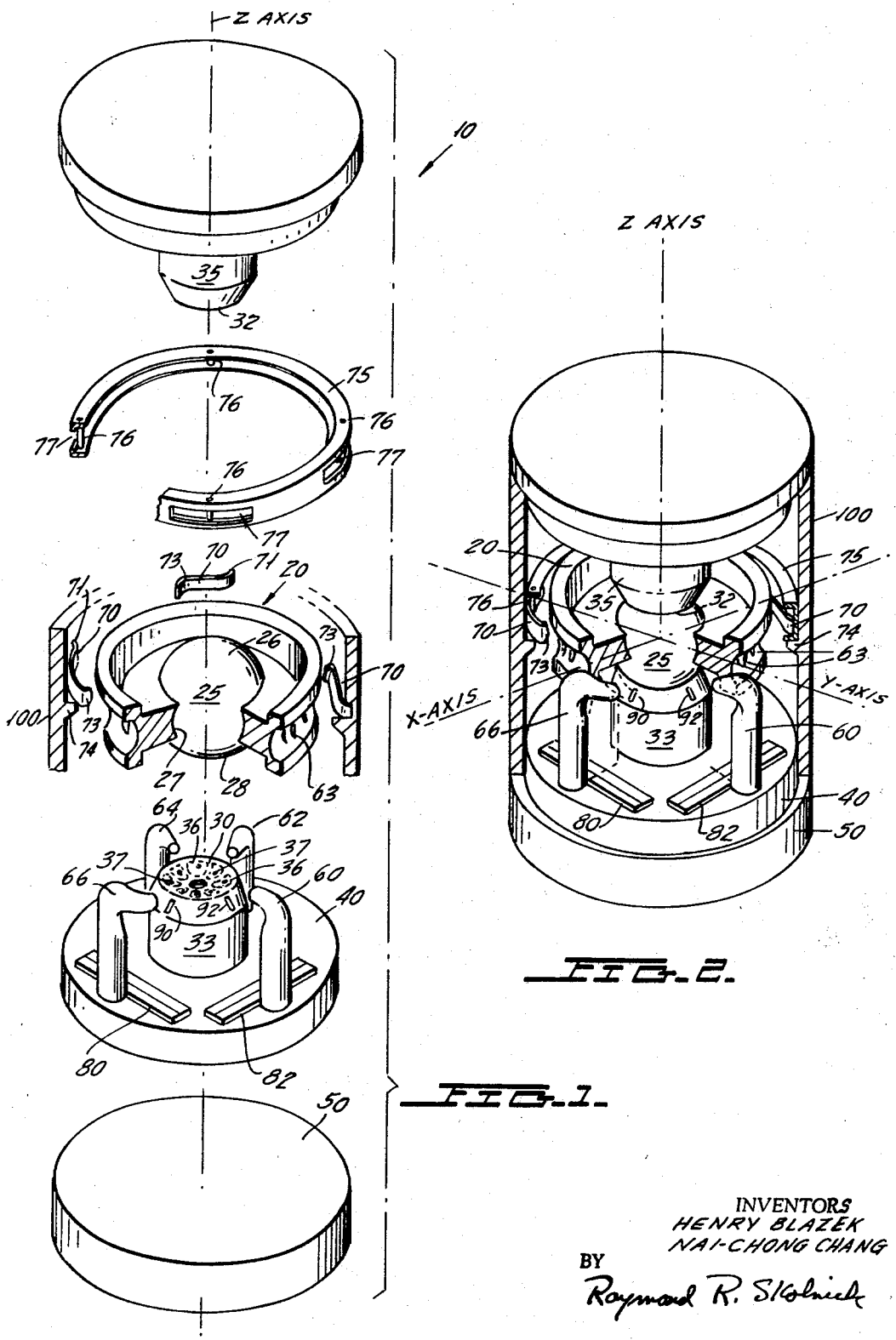
FIGURE 1 is an exploded perspective view of a two degree of freedom attitude sensor constructed in accordance with the preferred teachings of our invention.
FIGURE 2 is a partially cutaway perspective view of the assembled apparatus shown in FIGURE 1.

Referring first to FIGURES 1 and 2, attitude sensor 100 includes a rotating gyroscopic mass 20 having a generally wheel-like configuration. The central region of gyroscopic mass 20 integrally contains a spherical ball bearing member 25, which may be typically press fit in cooperating aperture 27 to form the aforesaid integral construction. Spherical bearing member 25 may typically be a readily available commercial type ball bearing member, accurately machined and maintained to tight tolerances.

To obtain as much rigidity as possible, rotary member 20 is constructed to have a high density, and to be rotated at high speeds while maintaining the deflective forces at a minimum by virtue of an extremely low friction bearing support structure. Such a low friction support structure is obtained in accordance with the preferable teachings of our invention by the positioning of the outwardly extending upper and lower surfaces 26, 28 of spherical bearing member 25 within spherical disclike indentations 30, 32 of support pad members 33, 35 respectively. As will subsequently be more fully discussed, support pad members 33, 35 are aligned along longitudinal axis Z and spaced apart such that the volume defined by the spherical support surfaces 30, 32 contain spherical bearing member 25, with there being a thin gap therebetween for the reception of a high pressure gas flow. The spherical support surfaces 30, 32 preferably include a plurality of recesses such as 36 typically formed by etching or coining. By providing such recess areas the requirements of maintaining extreme dimensional tolerances are considerably reduced while providing a more symmetrical flow of gas and consequently a lower turbine torque. Further, the pressure gradient within the recess area is more nearly constant since most of the pressure drop will occur around the rim of the pad, thereby resulting in a stiffer bearing.

High pressure gas is directed into the gap provided intermediate the spherical surfaces 26, 28 of bearing member 25 and the cooperating indented surfaces 30, 32 of the support pad members 33, 35 by inlet orifices such as 37. These inlet orifices are interconnected by suitable passageways, through the support pad members 33, and base housing 40 to gas tank assembly 50. Accordingly, the cooperation of members 25, 33 and 35, and the gas flow directed therebetween provides a low frictional hydrostatic gas bearing for rotating gyroscopic member 20.

The freedom of movement provided about the hydroscopic bearing permits attitude variation of housing 100, to which support pad members 33, 35 are secured, about mutually perpendicular axes X and Y relative to the fixed disposition in space of rotating member 20. Such movement about the Y axis is diagrammatically shown in FIGURE 3. Gyroscopic member 20 is shown rotating about its axis 15, corresponding to its referenced attitude position. Attitude variation of housing 100 about the Y axis equal to $\alpha$ will provide the relationship shown in FIGURE 3 with the relative movement being permitted by the swiveling of support bearing 25 within the support pads 33, 35. Similarly, attitude variation of housing 100 about the X axis will likewise be permitted by the swiveling of support bearing 25 within the support pads 33, 35. Hence, our invention advantageously provides two-degree-of-freedom gyro movement over a substantial range, as for example approximately plus and minus 50 degrees, in a manner avoiding the complex gimbal support arrangements of the prior art constructions, and their resultant inaccuracies.

Initial motivation of the rotating member 20 is illustratively shown provided by a plurality of gas nozzles 60, 62, 64, 66 peripherally located about member 20. The outer peripheral-most region of rotating member 20 includes a plurality of bucket type pockets 63 suitably formed such that the high speed gas flow directed thereagainst will rapidly provide spin-up of member 20 to a suitable angular velocity. Such a spin-up characteristic 100 is typically shown in FIGURE 6, wherein the gas flow is shown to provide a speed of about approximately 40,000 r.p.m. within 75 milliseconds.

During this initial speed-up period the gyroscopic member 20 is preferably aerodynamically caged in its referenced position as shown in FIGURE 5 such that its axis of rotation 15 is in alignment with the support pad axis Z. Such aerodynamic caging is provided by the interreaction of the gas flow against the outermost notched peripheral configuration 72 such that should the member 20 stray from its referenced position as shown in FIGURE 5, compensating restoring torques will be developed by a small radial component of the gas flow within the notched region 72 to restore member 20 to its referenced position.

As another advantageous aspect of our invention, centering of support bearing member 25 within the spherical support volume defined by supporting surfaces 30, 32 of support pad members 35, 33 is automatically provided by pressure differential build-ups within the gap intermediate said members.

Referring more specifically to FIGURE 4, a condition is shown wherein bearing support member 25 is moved to the right and is eccentrically located with respect to the volume defined by the support pad surfaces 30, 32. Accordingly, the right-hand portion of the gap is constricted resulting in a pressure build-up at that region, as shown by arrows F, tending to restore the support bearing 25 concentric with respect to bearing pad surfaces 30, 32. Hence the hydrostatic support-bearing arrangement of our invention acts as a spring tending to keep the members in their concentric position.

Prior to activation of the device 10 it is preferable that the rotating member 20 be mechanically caged in its referenced position. Such caging is shown provided by a plurality of spring members 70 secured at end 71 to a suitable indentation in housing 100, with its free end 73 engaging the peripheral region of member 20. Accordingly, such mechanical engagement of end 73 of spring members 70 within notched region 72 will maintain member 20 in the referenced position shown in FIGURE 2 prior to spin-up operation activation of nozzles 60–66. Mechanical caging members 70 are preferably automatically disengaged responsive to activation of gas jet nozzles 60–66 by rotatable casing ring 75 freely supported on indentation 74 of housing 100. Caging ring 75 includes a plurality of release posts 76, each positioned to engage a cooperating one of the spring members 70. In the caged position, each of posts 76 are placed within the gas stream flow of one of the nozzles 60–66 such that activation of the gas nozzles directs the gas flow thereagainst, resulting in rotation of caging ring 75. Such rotation of the caging ring 75 urges release posts 76 against caging springs 70 to outwardly force it away from the peripheral notched surface 72 of member 20, thereby disengaging the mechanical caging means. Suitable apertures 77 are shown in caging ring 75 to permit the introduction therein of the forward end 73 of caging springs 70.

Spin-up motivation of apparatus 10 is thus provided by gas ejecting nozzle members 60–66 which it is seen serve the additional functions of aerodynamically caging gyroscopic member 20 in its referenced position during the initial spin-up period, and releasing mechanical caging members 70. Such initiation of the gas flow is typically provided by a conventional squibb (not shown) in the gas supplied tank 50 which breaks the gas supply seal and thereby simultaneously provides suitable pressure to nozzles 60 through 66 and the spherical gas-bearing pads 33, 35. When the gyro has reached its operating speed the drop of the supply pressure in reservoir 50 preferably actuates a suitable valve (not shown) to shut off the nozzle supply, with the remaining gas being used to hydrostatically support the gyro wheel assembly during its coast-down period, according to the typical characteristic 110 shown in FIGURE 7. It is naturally understood that through suitable variation of the motivating and gas supply means the basic concepts of our invention may likewise be employed to provide continuous operation devices.

Readout of attitude sensor 10 about axes X, Y is illustratively shown provided by light sensitive photo pots 80, 82 respectively. These photo pots may typically be of the commercial variety supplied by the Duncan Electronics, Inc., of Costa Mesa, California. Photo pots 80, 82 operate in conjucntion with light sources 90, 82, respectively, provided within suitable apertures of lower support pad members 33. Considering first the operation of the X readout pot 80, light source 90 provides a multi-reflective path as shown by the dashed lines of FIGURE 2, which includes the lower surfaces of gyroscopic member 20. When located in its referenced position the reflected beam of light energy is intermediately located along the length of photosensitive potentiometer member 80 as shown in FIGURE 2. Relative attitude variation of housing 100 about the X axis will correspondingly vary the path traversed by the light beam such that it will move along the length of potentiometer 80 responsive to the extent of such attitude variation. Similarly, the path traversed by the light beam intermediate source 92 and potentiometer 82 will vary responsive to attitude variation of housing 100 about the Y axis. Accordingly, the movement of the light beams along the photosensitive pots 80, 82 is analogous to the wiper of a conventional potentiometer, thereby providing electrical signals proportional to the angular attitude variation about the orthogonally related sensing axes X, Y.

By virtue of the simplicity and ruggedness of my invention, it has found particular utility in high-g environments, as for example attitude sensing of a short range battlefield type missile. The supply pressure of tank assembly 50 to form the hydrostatic gas bearing is selected to adequately support the gyro wheel assembly under, for example, 300 $g$ axial component of acceleration along the support pad axis Z; such a hydrostatic gas bearing support being typically obtained by a 540 p.s.i. source operating in conjunction with a 1.25" diameter gyro member 20, supported by a 0.5" diameter support bearing 25, and weighing approximately 0.05 lb. The hydrostatic bearing like wise will be able to withstand a substantial, though lesser, transverse load.

Because of the extreme simplicity of structure, we have found that parasitic torques errors resulting from angular motion of the gyro case, assymmetries in the bearing geometry and the unequal elastic properties of member 20 are considerably less than the errors obtained from conventional gimbal supported gyroscopic devices.

Further, a two degree of freedom gyro must normally be balanced with respect to a point in space, i.e., the center of gravity must be made to coincide with the center of the support. However, since our invention avoids a floated gimbal, it is merely necessary to balance gyro wheel assembly 20 with respect to a line along the spin axis Z. This results from the fact that a displacement of the center of gravity of member 20 in a plane normal to the spin axis Z, in combination with an acceleration input along the spin axis Z, will produce a torque sinusoidally varying with gyro angle of rotation and hence having substantially a net zero effect over a complete revolution of the gyro wheel assembly 20.

It is accordingly seen that the above described gyroscopic apparatus permits two degree of freedom movement of the housing 100 relative to the rotating gyroscopic member 20 in a simplified manner, with there being an automatic readout of the attitude variation over mutually perpendicular axes X and Y.

Although in the foregoing specification, our invention has been described in conjunction with preferred embodiments, many variations and modifications will now become apparent to those skilled in the art, and it is preferred, therefore that the instant invention be limited not by the specific disclosure contained herein but only by the appended claims.

The embodiments of the invention in which an exclusive privilege or property is claimed are defined as follows:

1. A gyroscopic apparatus comprising a rotatable mass; means rotatively supporting said mass about an axis of rotation; said means comprising a housing frame including first and second supporting members, in spaced apart relationship about the central region of said mass motivating means mounted to said housing frame for imparting rotation of said rotatable mass relative to said supporting members; said mass having an integrally formed ball-like configuration at its central region providing generally spherical first and second convex support surfaces at said central region, outwardly projecting from opposed surfaces of said mass; said first and second supporting members having generally spherical first and second concave supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported.

2. A gyroscopic apparatus comprising a rotatable mass; means rotatively supporting said mass about an axis of rotation; said means comprising a housing frame including first and second supporting members, in spaced apart relationship about the central region of said mass motivating means mounted to said housing frame for imparting rotation of said rotatable mass relative to said supporting members; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; said supporting members being secured to said housing frame and having a fixed disposition relatve thereto; said rotatable mass having a substantially fixed attitude in space; said support means rotatively supporting said mass in said fixed attitude responsive to attitude variation of said housing frame and supporting members.

3. A gyroscopic apparatus comprising a rotatable mass; means rotatively supporting said mass about an axis of rotation; said means comprising a housing frame comprising first and second supporting members, in spaced apart relationship about the central region of said mass motivating means mounted to said housing frame for imparting rotation of said rotatable mass relative to said supporting members; said mass having an integrally formed ball-like configuration at its central region providing generally spherical first and second convex support surfaces at said central region, outwardly projecting from opposed surfaces of said mass; said first and second supporting members having generally spherical first and second concave supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; centering means for concentrically maintaining said support surfaces intermediate the volume defined by said spaced apart supporting surfaces; said centering means being provided by said gaseous flow within said gap means; the concentric location of said support surfaces within said volume providing a symmetric pressure distribution within said gap means; off center movement of said support surfaces establishing a pressure differential within said gap means serving to restore said concentric location.

4. A gyroscopic apparatus comprising a rotatable mass; means rotatively supporting said mass about an axis of rotation; said means comprising first and second supporting members, in spaced apart relationship about the central region of said mass; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; a housing frame; said supporting members being secured to said housing frame and having a fixed disposition relative thereto; said rotatable mass having a substantially fixed attitude in space; said support means rotatively supporting said mass in said fixed attitude responsive to attitude variation of said housing frame and supporting members; centering means for concentrically maintaining said support surfaces intermediate the volume defined by said spaced apart supporting surfaces; said centering means being provided by said gaseous flow within said gap means; the concentric location of said support surfaces within said volume providing a symmetric pressure distribution within said gap means; off center movement of said support surfaces establishing a pressure differential within said gap means serving to restore said concentric location.

5. A gyroscopic apparatus comprising a rotatable mass; means rotatively supporting said mass about an axis of rotation; said means comprising first and second supporting members, in spaced apart relationship about the central region of said mass; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; a housing frame; said supporting members being secured to said housing frame and having a fixed disposition relative thereto; said rotatable mass having a substantially fixed attitude in space; said support means rotatively supporting said mass in said fixed attitude responsive to attitude variation of said housing frame and supporting members; means sensing the attitude of said housing frame relative to said rotating mass; said means providing output signals responsive to attitude variation of said housing frame about first and second sensing axes, perpendicular to one another.

6. A gyroscopic apparatus comprising a rotatable mass; means rotatively supporting said mass about an axis of rotation; said means comprising first and second supporting members, in spaced apart relationship about the central region of said mass; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; a housing frame; said supporting members being secured to said housing frame and having a fixed disposition relative thereto; said rotatable mass having a substantially fixed attitude in space; said support means rotatively supporting said mass in said fixed attitude responsive to attitude variation of said housing frame and supporting members; motivating means for rapidly rotating said rotatable means; said motivating mass comprising a plurality of gas ejecting nozzles peripherally located about said rotatable mass when in a reference disposition relative to said housing frame; the outer periphery of said rotatable mass including gas receiving pockets for imparting rotation to said rotatable mass responsive to actuation of said nozzles.

7. A gyroscopic apparatus comprising a rotatable mass; means rotatively supporting said mass about an axis of rotation; said means comprising a housing frame including first and second supporting members, in spaced apart relationship about the central region of said mass; motivating means mounted to said housing frame for imparting rotation of said rotatable mass relative to said supporting members; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; said supporting members being secured to said housing frame and having a fixed disposition thereto; said rotatable mass having a substantially fixed attitude in space; said support means rotatively supporting said mass in said fixed attitude responsive to attitude variation of said housing frame and supporting members; caging means for locating said rotatable mass in a predetermined reference disposition during initial rotation thereof.

8. A gyroscopic apparatus comprising a rotatable mass; means rotatively supporting said mass about an axis of rotation; said means comprising first and second supporting members, in spaced apart relationship about the central region of said mass; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; a housing frame; said supporting members being secured to said housing frame and having a fixed disposition relative thereto; said rotatable mass having a substantially fixed attitude in space; said support means rotatively supporting said mass in said fixed attitude responsive to attitude variation of said housing frame and supporting members; caging means for locating said rotatable mass in a predetermined reference disposition during initial rotation thereof; motivating means for rapidly rotating said rotatable mass; said motivating means comprising a plurality of gas ejecting nozzles peripherally located about said rotatable mass when in said reference disposition relative to said housing frame; the outer periphery of said rotatable mass including gas receiving pockets for imparting rotation to said rotatable mass responsive to actuation of said nozzles; said caging means comprising a groove about the outer periphery of said rotatable mass; said groove cooperating with the gas flow from said nozzles to establish restoring torques responsive to variation of said rotatable mass from said reference disposition.

9. A gyroscopic apparatus comprising a rotatable mass; means rotatively supporting said mass about an axis of rotation; said means comprising first and second supporting members, in spaced apart relationship about the central region of said mass; said mass having generally spherical first and second support surfaces at said central region, outwardly projecting from opposed surfaces thereof; said first and second supporting members having generally spherical first and second supporting surfaces shaped to cooperatively receive said first and second support surfaces respectively; said spaced apart relationship dimensioned to provide a thin gap means intermediate said cooperatively received spherical surfaces; pressurized gas means for directing a gaseous flow into said gap means, whereby said rotatable mass is hydrostatically supported; a housing frame; said supporting members being secured to said housing frame and having a fixed disposition relative thereto; said rotatable mass having a substantially fixed attitude in space; said support means rotatively supporting said mass in said fixed attitude responsive to attitude variation of said housing frame and supporting members; first caging means for locating said rotatable mass in a predetermined reference disposition during initial rotation thereof; motivating means for rapidly rotating said rotatable mass; said motivating means comprising a plurality of gas ejecting nozzles peripherally located about said rotatable mass when in said reference disposition relative to said housing frame; the outer periphery of said rotatable mass including gas receiving pockets for imparting rotation to said rotatable mass responsive to actuation of said nozzles; said first caging means comprising a groove about the outer periphery of said rotatable mass; said groove cooperating with the gas flow from said nozzles to establish restoring torques responsive to variation of said rotatable mass from said reference disposiiton; second caging means maintaining said rotatable mass in substantially said predetermined reference position prior to rotational motivation thereof; and second caging means including means mechanically engaging said rotatable mass; release means for said second caging means; said release means being operatively responsive to the gas flow from said nozzle, whereby said second caging means is automatically released responsive to actuation of said motivating means.

10. The gyroscopic apparatus as set forth in claim 5, wherein said sensing means include energy sensitive means fixedly located with respect to said housing frame; energy source means establishing an energy flow path including said energy sensitive means and an energy reflective surface of said rotatable mass; attitude variation of said housing frame about said sensing axes varying the energy directed to said energy sensitive means to provide said output signals.

11. An attitude sensor comprising a housing, a gyroscopic disc, gyroscopic support means secured to said housing; and motivating means mounted to said housing for imparting rotation of said gyroscopic disc relative to said support means; said housing longitudinally extending along a vertical axis; a spherical ball-like support member integrally secured to the central region of said gyroscopic disc, and including spherically convex support surfaces to define a generally spherical volume outwardly projecting from opposed surfaces thereof; said spherical support member rotatively supporting said gyroscopic disc within said volume, to permit attitude variation of said housing relative to said gyroscopic disc, about first and sensing axes, perpendicular to one another and perpendicular to said vertical axis; said axes intersecting at the center of said ball-like support member; bearing means for receiving said support surfaces and providing low frictional rotative engagement of said support and supporting members, while permitting the axis of rotation of said gyroscopic disc to vary relative to said longitudinal axis; said variation corresponding to said attitude variation.

12. An attitude sensor comprising a housing, a gyroscopic disc, gyroscopic support means secured to said housing; and motivating means mounted to said housing for imparting rotation of said gyroscopic disc relative to said support means; said housing longitudinally extending along a vertical axis; said support means including supporting members secured to said housing and including spaced spherically concave surfaces to define a generally spherical volume along said vertical axis; a spherical ball-like support member integrally secured to the central region of said gyroscopic disc, and including spherically convex support surfaces outwardly projecting from opposed surfaces thereof; said spherical support member rotatively supporting said gyroscopic disc within said volume, to permit attitude variation of said housing relative to said gyroscopic disc, about first and second axes, perpendicular to one another and perpendicular to said vertical axis; said axes intersecting at the center of said ball-like support member; bearing means for providing low frictional rotative engagement of said support and supporting members, while permitting the axis of rotation of said gyroscopic disc to vary relative to said longitudinal axis; said variation corresponding to said attitude variation; said bearing means comprising a gap means intermediate said support and supporting surfaces; pressurized gas means for directing a gaseous flow into said gap, whereby said rotating disc is hydrostatically supported.

13. An attitude sensor comprising a housing, a gyroscopic disc, gyroscopic support means secured to said housing; and motivating means mounted to said housing for imparting rotation of said gyroscopic disc relative to said support means; said housing longitudinally extending along a vertical axis; said support means including supporting members secured to said housing and defining a generally spherical volume along said vertical axis; a spherical support member being integrally secured to the central region of said gyroscopic disc, and outwardly projecting from opposed surfaces thereof; said spherical support member rotatively supporting said gyroscopic disc within said volume, to permit attitude variation of said housing relative to said gyroscopic disc, about first and second axes, perpendicular to one another and perpendicular to said vertical axis; bearing means for providing low frictional rotative engagement of said support and supporting members, while permitting the axis of rotation of said gyroscopic disc to vary relative to said longitudinal axis; said variation corresponding to said attitude variation; said bearing means comprising a gap means intermediate said support and supporting surfaces; pressurized gas means for directing a gaseous flow into said gap, whereby said rotating disc is hydrostatically supported, further including centering means for concentrically maintaining said spherical support member within said volume; said centering means being provided by said gaseous flow within said gap means; the concentric location of said spherical support member within said volume defining a symmetric pressure distribution within said gap means; off-center movement of said spherical support member establishing a pressure differential within said gap means serving to restore said concentric location.

14. An attitude sensor comprising a housing, a gyroscopic disc, and gyroscopic support means; said housing longitudinally extending along a vertical axis; said support means including supporting members secured to said housing and defining a generally spherical volume along said vertical axis; a spherical support member being integrally secured to the central region of said gyroscopic disc, and outwardly projecting from opposed surfaces thereof; said spherical support member rotatively supporting said gyroscopic disc within said volume, to permit attitude variation of said housing relative to said gyroscopic disc, about first and second axes, perpendicular to one another and perpendicular to said vertical axis; bearing means for providing low frictional rotative engagement of said support and supporting members, while permitting the axis of rotation of said gyroscopic disc to vary relative to said longitudinal axis; said variation corresponding to said attitude variation; said bearing means comprising a gap means intermediate said support and supporting surfaces; pressurized gas means for directing a gaseous flow into said gap, whereby said rotating disc is hydrostatically supported, wherein said pressurized gas means is of a sufficient pressure to rotatively support said gyroscopic disc responsive to up to approximately a 300 $g$ acceleration component along said vertical axis.

15. An attitude sensor comprising a housing, a gyroscopic disc, and gyroscopic support means; said housing longitudinally extending along a vertical axis; said support means including supporting members secured to said housing and defining a generally spherical volume along said vertical axis; a spherical support member being integrally secured to the central region of said gyroscopic disc, and outwardly projecting from opposed surfaces thereof; said spherical support member rotatively supporting said gyroscopic disc within said volume, to permit attitude variation of said housing relative to said gyroscopic disc, about first and second axes, perpendicular to one another and perpendicular to said vertical axis; bearing means for providing low frictional rotative engagement of said support and supporting members, while permitting the axis of rotation of said gyroscopic disc to vary relative to said longitudinal axis; said variation corresponding to said attitude variation; said bearing means comprising a gap means intermediate said support and supporting surfaces; pressurized gas means for directing a gaseous flow into said gap, whereby said rotating disc is hydrostatically supported, further including motivating means for rapidly rotating said gyroscopic disc; said motivating means comprising a plurality of gas ejecting nozzles peripherally located about said gyroscopic disc when in a predetermined reference disposition relative to said housing; the outer periphery of said disc including gas receiving pockets for imparting rotation to said gyroscopic disc responsive to actuation of said nozzles; caging means for locating said gyroscopic disc in said predetermined reference disposition during initial rotation thereof; said caging means comprising a groove about the outer periphery of said disc; said groove cooperating with said gas flow from said nozzles to establish restoring torques responsive to variation of said rotatable mass from said reference disposition.

16. An attitude sensor comprising a housing, a gyroscopic disc, and gyroscopic support means; said housing longitudinally extending along a vertical axis; said support means including supporting members secured to said housing and defining a generally spherical volume along said vertical axis; a spherical support member being integrally secured to the central region of said gyroscopic disc, and outwardly projecting from opposed surfaces thereof; said spherical support member rotatively supporting said gyroscopic disc within said volume, to permit attitude variation of said housing relative to said gyroscopic disc, about first and second sensing axes, perpendicular to one another and perpendicular to said vertical axis; bearing means for providing low frictional rotative engagement of said support and supporting members, while permitting the axis of rotation of said gyroscopic disc to vary relative to said longitudinal axis; said variation corresponding to said attitude variation; said bearing means comprising a gap means intermediate said support and supporting surfaces; pressurized gas means for directing a gaseous flow into said gap, whereby said rotating disc is hydrostatically supported; centering means for concentrically maintaining said spherical support member within said volume; said centering means being provided by said gaseous flow within said gap means; the concentric location of said spherical support member within said volume defining a symmetric presure distribution within said gap means; off-center movement of said spherical support member establishing a pressure differential within said gap means serving to restore said concentric location; motivating means for rapidly rotating said gyroscopic disc; said motivating means comprising a plurality of gas ejecting nozzles peripherally located about said gyroscopic disc when in a predetermined reference disposition relative to said housing; the outer periphery of said disc including gas receiving pockets for imparting rotation to said gyroscopic disc responsive to actuation of said nozzles; caging means for locating said gyroscopic disc in said predetermined reference disposition during initial rotation thereof; said caging means comprising a groove about the outer periphery of said disc; said groove cooperating with said gas flow from said nozzles to establish restoring torques responsive to variation of said rotatable mass from said reference disposition; sequential operating means intitially directing gas flow to said gap means and nozzles to provide rotation of said disc in said predetermined reference disposition; and subsequently deactivating the gas flow to said nozzles whereby the gyroscopic action of said disc maintains its attitude in space responsive to attitude variation of said housing; means sensing the attitude of said housing relative to said reference attitude established by said gyroscopic disc.

17. An attitude sensor as set forth in claim 16, wherein said sensing means include energy sensitive means fixedly located with respect to said housing; energy source means establishing an energy flow path including said energy sensitive means and an energy reflective surface of said gyroscopic disc; attitude variation of said housing frame about said sensing axes varying the energy directed to said energy sensitive means to provide said output signals.

References Cited
UNITED STATES PATENTS

| | | | |
|---|---|---|---|
| 2,091,964 | 9/1937 | Carter | 74—5.43 X |
| 2,940,318 | 6/1960 | Adams et al. | 74—5 |
| 3,115,784 | 12/1963 | Parker | 74—5.12 |

FRED C. MATTERN, JR., *Primary Examiner.*

PALMER W. SULLIVAN, *Examiner.*